Figure 1:
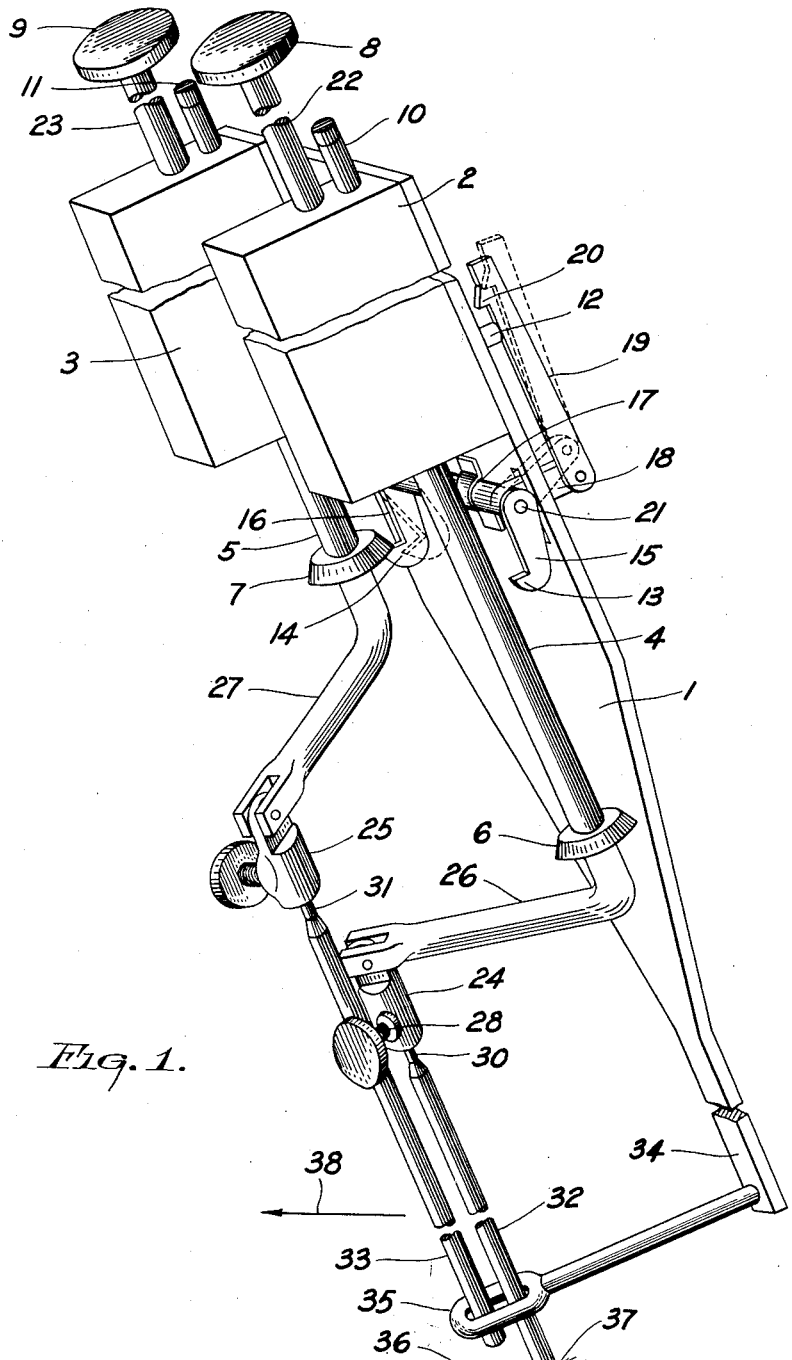

Sept. 11, 1956  J. A. VAN BERGEN  2,762,947
WELDING DEVICE

Filed April 13, 1954  2 Sheets-Sheet 1

INVENTOR.
JAN ANTHONIE VAN BERGEN
BY Fred M Vogt
AGENT.

Sept. 11, 1956  J. A. VAN BERGEN  2,762,947
WELDING DEVICE

Filed April 13, 1954  2 Sheets-Sheet 2

INVENTOR.
JAN ANTHONIE VAN BERGEN
BY
AGENT

United States Patent Office 2,762,947
Patented Sept. 11, 1956

2,762,947
WELDING DEVICE

Jan Anthonie Van Bergen, Eindhoven, Netherlands, assignor to Hartford National Bank and Trust Company, Hartford, Conn., as trustee Application April 13, 1954, Serial No. 422,878

Claims priority, application Netherlands April 22, 1953

3 Claims. (Cl. 314—4)

This invention relates to welding devices, preferably for use in touch-welding which comprise at least two rod holders and which perform a movement with regard to the workpiece during operation, the welding operation each time being continued automatically by a new welding rod in the next holder after the welding rod in use has been consumed to a given length.

In a known device of the aforesaid type the end of the new rod facing the arc is maintained in a definite position by the holder of the rod in use. As soon as the last-mentioned rod is used up its holder is moved back with the result that the guiding of the new rod ceases automatically. Since the welding rods are clamped only over a small part of their length and are never perfectly straight, it is possible that, in the known device, the position of the end of the new rod facing the arc is modified relatively to the workpiece owing to the fact that the rod is no longer being guided. In order to obtain a continuous bead the welder must change the position of the device relative to the workpiece so that the new rod continues welding where the consumed rod stopped.

The present invention has for one of its objects to overcome this disadvantage. Thus, according to the invention the welding rods are guided by the device at the end facing the arc during the welding operation. This has the advantage that the position relative to the workpiece occupied by the rod in the device, is determined by the guiding means both prior to and during welding. If the rods subtend an angle the welder knows the deviation of the new rod relatively to the bead produced and is thus able to make allowance for this when the new rod takes over. During the welding operation, the position of the rod will no longer change arbitrarily relatively to the workpiece. If the new rods are guided approximately into the position of the consumed rod, the welding operation is automatically continued by the new rod where the consumed rod has stopped welding.

This is of particular importance in touch-welding since not only deviations of the position of the rod holders and curvature of the rod but also contact between the rod and the workpiece during the welding operation may involve discrepancies in the position of the rod end facing the arc.

In a suitable embodiment of the invention, the guide member for the ends facing the arc has a substantially U-shaped opening in which the welding rod in use and new welding rods for continuing the welding operation are lying therein in such a manner that the direction of the limbs of the U substantially coincides with the direction of welding. Due to the form of the opening of the guide member, the position at right angles to the direction of welding is exactly determined of the rod end facing the arc. Of course, the width of the opening will be chosen in accordance with the thickness of the rods in use. Since the rods are usually slightly inclined relatively to the workpiece the rod end facing the arc will also be determined in the welding direction both in normal arc-welding under the action of gravity and in touch-welding due to friction between the rod and the workpiece. By a suitable choice of the sequence in which the rod in use and the successive rods can be introduced into the opening relatively to the welding direction, a continuous bead can be obtained despite the fact that little time is lost in changing from one rod to another. In fact, the new rod, viewed in the welding direction, can be slightly lagging behind the rod in use, which results in a slight overlapping of the bead.

In the device according to the invention which is employed for so-called contact rods, the guide member is an oval ring and readily interchangeable. Due to friction between the welding rod and the workpiece the rod end facing the arc tends to lag relatively to the device. By the use of a ring said end is compelled exactly to follow the relative movement of the device relative to the workpiece. When the device is inoperative, for example during working intervals when the rod is lifted from the workpiece, the position of the end facing the arc will remain unchanged under the action of gravity, owing to the inclination of the rod relative to the work-piece.

Since the effect accruing from the invention increases as the guide member approaches the arc more closely, the guide member is made from a metal of high thermal conductivity. It has, in effect, been found in practice that a refractory metal is unable to withstand the high temperatures which occur in the proximity of the arc. An example of a metal having a high thermal conductivity is copper, despite its fairly low melting point as compared, for example, with that of iron.

Since, in practice, the rod holders will be spaced apart in connection with their guiding apparatus, and the rod ends facing the arc are to be slipped through the same opening the mounted rods should have some freedom of motion relatively to the guided part of the holder. In the device according to the invention in which the rod holders are guided parallel to each other, each holder is Z-shaped, one shaft being rotatable about its own axis and guided so as to be displaceable in its own direction and the other shaft carrying the rod end remote from the arc, while one of the shafts is pivoted to the remaining part so as to be movable in the plane of the Z. In this manner the mounted welding rods have sufficient freedom of motion and, moreover, the position of the holder is exactly determined by the guiding of the rod end facing the arc. This moreover permits the welding rods to be supplied to the weld substantially parallel to each other and in a substantially equal position relative to the device. To this end the ring is so provided and, in connection with its position, the spacing between the guided shafts of the holders is such that the rods extend substantially parallel to the guided shafts of the holders, thus ensuring in a simple manner that the angle of welding is substantially equal for all the holders.

Figure 2:
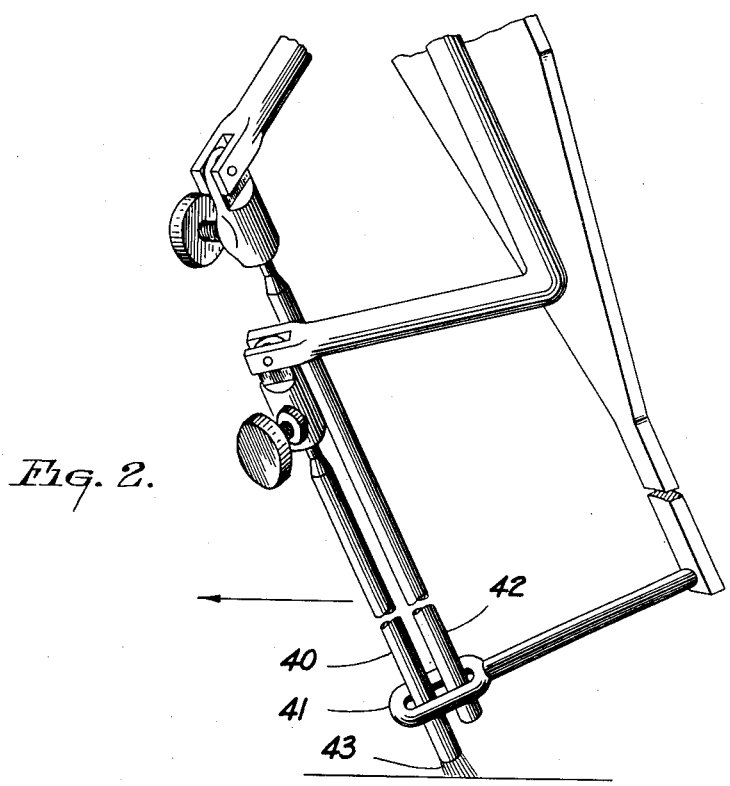

In order that the invention may be readily carried into effect, it will now be described in greater detail with reference to the accompanying drawing, in which Fig. 1 shows a device according to the invention in perspective for touch-welding which comprises rod holders, Fig. 2 shows a detail of a device according to the invention for normal welding.

Referring more particularly to Fig. 1, two welding heads 2, 3 according to the invention for touch-welding, which comprises two rod holders is shown in perspective. Two welding heads 2 and 3 each comprising a holder 4 and 5 respectively are secured to a base 1 such that the holders extend parallel to each other. The heads 2 and 3 are fully identical and constructed as described in British patent specification 682,224. The holders 4 and 5 comprise collars 6 and 7 respectively and collars 8 and 9 respectively at the top. The heads 2 and 3 comprise contact members 10 and 11 respectively in the path of the collars 8 and 9 respectively. The lifting device for the welding heads 2 and 3 respectively comprises a stud following its movement. In the figure only one stud 12 is visible, namely that of the head 2; the other stud, however, is identical with stud 12. Operatively connected to the base 1 are two dogs 13 and 14. By means of a spring (not shown) each dog 13 and 14 is maintained in the path of the collars 6 and 7 respectively and forms part of pivoting arms 15 and 16 respectively. The arm 16 is connected to one end of a sleeve 17 whose other end carries an arm 18. Pivoted to the latter is a second arm 19 furnished with an abutment stop 20 which is maintained in the path of the stud 12 by means of a spring (not shown). The sleeve 17 is so mounted on the base 1 as to be rotatable about its own axis. In the sleeve 17 a shaft 21 is also rotatable about its own axis. Similarly thereto, this shaft has connected to it an arm 15 and at its other end a stop co-acting with a stud of the lifting device in the head 3. It will be obvious that an upward movement of the stud 12 causes the dog 14 to turn away through the stop 20, arm 19, arm 18 and sleeve 17 to effect the removal of said stud from the path of the collar 7. This movement does not influence the position of the dog 13. In the same manner, an upward movement of the invisible stud of the welding head 3 will cause the dog 13 to turn out of the path of the collar 6 without affecting the position of the dog 14.

Each holder 4 and 5 is Z-shaped. When charged, the upper shafts 22 and 23 are displaceable in their own direction as described in the British patent specification 682,224 and also rotatable about their own axes owing to the circular form of the shafts 22 and 23. The other shafts 24 and 25 are pivoted to the connecting parts 26 and 27 respectively of both shafts so as to be movable in the plane of the holders 4 and 5 respectively, and comprise clamping devices 28 and 29 respectively, for the uncoated part of the welding rods 30 and 31 respectively. The ends 32 and 33 facing the arc are guided by an oval ring 35 interchangeably secured to the end 34 of the base 1. In the condition as shown in the drawing the welding rod 30 rests on a workpiece 36 to be welded and an arc 37 is struck between the workpiece 36 and the rod 30. The welding device is moved in the direction of the arrow 38 relatively to the workpiece. Viewed in the direction of the arrow 38, the welding rod 30 is lagging behind the rod 31.

The operation of the device is as follows: Starting from the condition shown in the drawing, in which the holder 4 is enabled to descend accordingly as the welding rod 30 is used up and the descent of the holder 5 is prevented only by the dog 14 on which the collar 7 rests, the holder 4 will descend until the collar 8 rests on the contact member 10. In this manner the welding current is partly sent through a coil to the effect of pulling out a stud which enables the lifting device to lift the holder 4. During this upward motion the stud 12 abuts against the stop 20 so that the arm 19 is first moved upwardly. In the aforesaid manner the dog 14 is turned out of the path of the collar 7 so that the holder 5 descends until the rod 31 rests on the workpiece 36 and is struck. In order to insure that the weld bead will not be interrupted care is taken that the end 33 immediately takes the place of end 32 in the ring 35, as soon as the rod 30 is lifted. The movement of end 33 may be aided by a spring (not shown). The new rod 31 will now practically succeed the welding process on the place where the rod 30 is ended. During the further upward movement of the stud 12 the stop 20 is moved outwardly until the stud 12 moves beyond the stop 20, the dog 14 subsequently resuming its initial position in the path of collar 7. The welder is thus enabled to remove the remainder of the consumed rod 30 and to replace it with a new rod. The welding head 2 is recharged and the holder 4 is lifted until the dog 13 snaps behind the collar 6, the end of the new rod facing the arc 37 being slipped through the ring 35 and, viewed in the direction of the arrow 38, placed before the rod 31. After the welding rod has been consumed the same holds for the symmetrical part of the device.

If the above mentioned spring is used, by which the rods are urged against the back-side of the ring, it is not necessary to use a closed ring 35. In that case the guide member can consist of a U-shape, for the reason that the rods are held at their place by the spring if the device is lifted from the workpiece 36.

The relative position of the rods 30 and 31 and the ring 35 or a U-shaped guide member can be used unchanged in the normal welding, if a spring is used.

However, it is possible too to change the relative position of the rods in the normal welding as shown in Fig. 2. The welding rod 40 is now urged against the foreside of the ring 41 by gravity. As the welding rod 40 is used up a new rod 42 descends a certain distance. The arc 43 is taken over by the rod 42, rod 40 is lifted and thereafter rod 42 takes immediately the place at the foreside of the ring 41 by virtue of gravity.

While I have shown and described the preferred embodiment of my invention, it will be understood that the latter may be embodied otherwise then as herein specifically illustrated or described and that in the illustrated embodiment certain changes in the details of construction and in the arrangement of parts may be made without departing from the underlying idea or principle of the invention within the scope of the appended claims.

What is claimed is:

1. A welding device for welding a workpiece comprising at least two Z-shaped welding rod holders having welding rods therein, means for automatically replacing one of said welding rods in contact with said workpiece with the other of said welding rods after said one welding rod has been consumed to a given length, and a guide member having two spaced legs for guiding said welding rods therebetween at their ends adjacent to said workpiece, said guide member being constituted of a metal of high thermal conductivity, said legs of said guide member extending in a direction which substantially coincides with the direction of welding.

2. A welding device as set forth in claim 1 wherein each of said welding rod holders has a first shaft rotatable about its own axis and displaceable in the direction of its longitudinal axis, a second shaft carrying the end of the welding rod remote from said welding arc, a part connecting said first and second shafts and being substantially transverse thereto, and one of said shafts being pivotally connected to said part.

3. A welding device as set forth in claim 1 wherein each of said welding-rod holders has a first shaft rotatable about its own axis and displaceable in the direction of its longitudinal axis, a second shaft carrying the end of said welding rod remote from the arc, a part connecting said first and second shafts, one of the shafts being pivotally mounted on said part, and means for spacing said first and second shafts of the welding-rod holders so that the welding rods are positioned substantially parallel to said first and second shafts of the welding rod holders.

References Cited in the file of this patent

UNITED STATES PATENTS

| | | |
|---|---|---|
| 2,017,509 | Osborne | Oct. 15, 1935 |
| 2,453,950 | Berge et al. | Nov. 16, 1948 |
| 2,536,999 | Skytte | Jan. 2, 1951 |